Patented Apr. 30, 1946

2,399,206

UNITED STATES PATENT OFFICE 2,399,206

PROCESS

James B. Castner, Wilmington, Del., and Wesley M. Nagle, Woodbury, N. J., assignors to E. I. du Pont de Nemours & Company, Wilmington, Del., a corporation of Delaware No Drawing. Application February 4, 1944, Serial No. 521,126

10 Claims. (Cl. 252—324)

This invention relates to a novel and improved method of treating emulsions, and more particularly to a method of breaking emulsions between hydrocarbons and their derivatives and certain strong acids.

In the petroleum industry, a considerable number of cases are met where liquid hydrocarbons are treated or reacted with strong acids or in such acid media, under conditions where emulsification takes place, e. g. under very vigorous agitation. Such emulsions at times separate so slowly and are so difficult to resolve that industrial output is seriously handicapped because of the necessity of utilizing valuable storage space during separation.

An analogous situation is met in carrying out the preparation of nitro-derivatives of hydrocarbons by the nitration of said hydrocarbons by means of sulfuric acid-nitric acid mixtures, in which sulfuric acid predominates. Particularly where liquid mononitrocompounds are prepared, it is desirable to maintain very vigorous agitation in order that intimate contact between acid and hydrocarbon will exist, without the necessity of an excess of acid. This allows better control of the nitration and the preparation of a mononitrocompound very low in content of dinitrocompound. Under such conditions of vigorous agitation, emulsions form between the mononitrocompound and the strong acid that interfere with plant output and cause undesirable delays.

While attempts have been made to improve such situations and to prevent or break the emulsions, no entirely satisfactory procedure has been developed.

An object of the present invention is an improved method for treating emulsions between hydrocarbons and strong acids and accelerating their separation. A further object is such a method for treating emulsions between nitrohydrocarbons and acids. A still further object is a method for breaking such emulsions that comprises the use of a new type of demulsifying agent. Additional objects will be disclosed as the invention is described more at length hereinafter.

We have found that the objects of the invention are accomplished when an emulsified mixture of a liquid hydrocarbon, or a liquid nitrohydrocarbon, and a dehydrating acid is treated with a small amount of an inorganic fluorine compound. This serves to break the emulsion and accelerate the separation of the two components. As acids that come within the scope of the invention, we may use sulfuric or phosphoric acid. While inorganic fluorides are ordinarily sufficient alone to bring about the desired result, it is frequently desirable to add a mixture of a fluoride and silicious ingredient, for example, sodium fluoride and kieselguhr.

The invention will be understood more readily by reference to the following examples which show specific embodiments of the method of operation. It will be understood, of course, that these are by way of illustration only and are not to be taken as limiting in any way.

Example 1

Gasoline in the amount of 550 grams and 460 grams of 95.4% sulfuric acid were mixed and were vigorously agitated until thorough emulsification had taken place. The emulsified mixture was then divided into two parts in separate beakers, and 100 mgs. of sodium fluoride and 100 mgs. kieselguhr were stirred into one of the portions. Complete separation of the emulsion to which the fluoride and kieselguhr had been added took place after one minute, whereas such separation occurred only after nine minutes in the untreated portion.

Example 2

An emulsion was formed by very vigorous agitation of 200 cc. normal heptane and 200 cc. of 95.5% $H_2SO_4$. To one 200-cc. portion of the mixture in a graduate, a blend of 100 mgs. sodium fluoride and 100 mgs. kieselguhr was added. Separation of the treated emulsion occurred after 3½ minutes and only after 9 minutes in a similar amount of the untreated part.

Example 3

A similar emulsification test with 200 cc. of normal heptane and 75% sulfuric acid gave separating times of 40 seconds, and 1 minute 10 seconds for the treated and untreated samples, respectively.

Example 4

An emulsified blend was made by vigorous agitation of 200 cc. normal heptane and 200 cc. 90% orthophosphoric acid. Again the mixture was divided into two parts, one of which was treated as in Example 2. Separating times were observed of 15 seconds, and 4 minutes, 30 seconds, respectively, for the treated and untreated portions.

Example 5

Xylene in the amount of 2600 lbs. was introduced into a nitrator, agitated, and brought to a temperature of 110° F. A mixed acid in the amount of 8900 lbs. was added over a period of 30 minutes, this acid having the composition: 63.5% $H_2SO_4$, 19.0% $HNO_3$, 17.5% $H_2O$. A constant temperature of 110° F. was maintained and the agitation was sufficiently vigorous that a state of substantial emulsification existed throughout the mixture, this agitation being continued for five minutes after addition of the acid had been completed. A 50-50 mixture of sodium fluoride and kieselguhr, in the amount of 100 grams, was then added. After further agitation for 30 seconds, the nitrator contents were allowed to settle. A sharp separation of mononitroxylene and spent acid took place almost at once. The spent acid was drawn from the bottom of the nitrator, then the mononitroxylene layer. Similar nitration mixtures to which no addition of fluoride was made required 10 to 40 minutes for separation.

In carrying out the process of our invention, we find it important that the acid present be of greater than 50% strength. The acids forming emulsions which are adapted to be broken by our process include sulfuric acid and phosphoric acid, which may be designated dehydrating acids. Preferably we employ acids of at least 90% strength. In the case of sulfuric acid, strengths greater than 100% may be used, i. e., anhydrous sulfuric acid containing dissolved sulfur trioxide; e. g. acids up to 115% strength. The emulsions formed are considered to be of the hydrocarbon or nitrohydrocarbon-acid type, with said hydrocarbon or nitrohydrocarbon superposed on the acid layer after separation.

We find sodium fluoride very suitable for use, but alkali fluorides generally are satisfactory, in fact, any acid-soluble or acid-decomposable inorganic fluoride. As has been stated, we find it desirable to use the fluoride together with a silicious material, particularly an absorbent material such as kieselguhr. Hydrogen fluoride may be employed, if desired, or sodium fluosilicate. Varying amounts of the fluorine compound may be used, depending on the conditions of the reaction. No upper limit can be set, but it will be uneconomic generally to employ more than 1% by weight of the reacting materials. An advantage of the process is the very small amount of fluoride that gives effective separation, so that there is slight contamination of the products with fluorine. We find it desirable, however, to use as much as 5 parts fluorine compound per million parts of total liquids.

A process in which the present invention is advantageous is the acid alkylation process for the polymerization of hydrocarbons. In the preparation of octane isomers, for example, butylene and isobutane are introduced into concentrated sulfuric acid, with the formation of iso-octane. The vigorous agitation causes the emulsification of the mixture, and the emulsions frequently separate very slowly. The use of the fluoride agent of the present invention is very advantageous in this process. Alkylation processes involving other olefinic hydrocarbons are likewise benefited in the same manner.

The invention is highly useful, therefore, in a variety of processes involving liquid hydrocarbons and nitrohydrocarbons, where these are in very intimate contact with the acids named and where a liquid reaction product results. While nitroxylene is the only nitrohydrocarbon whose preparation has been described, the invention is likewise applicable to the manufacture of nitrobenzene, nitrotoluene, nitroethylbenzene, and the like.

We intend to be limited only by the following patent claims.

We claim:
1. A process for breaking an emulsion formed by vigorous agitation of a mixture of a compound of the group consisting of the liquid hydrocarbons and nitrohydrocarbons with an acid solution containing more than 50% of a strong dehydrating acid, which process comprises adding to said emulsion a compound taken from the group consisting of the acid-soluble and acid-decomposable inorganic fluorides, in an amount between 0.0005% and approximately 1.0% by weight of the liquids present.

2. The process of claim 1 in which the strong dehydrating acid is from the group consisting of sulfuric acid and phosphoric acid.

3. The process of claim 1 in which sodium fluoride is added to the emulsion.

4. The process of claim 1 in which hydrogen fluoride is added to the emulsion.

5. The process of claim 1 in which sodium fluosilicate is added to the emulsion.

6. The process for breaking an emulsion formed by the vigorous agitation of a liquid aliphatic hydrocarbon with sulfuric acid of greater than 50% strength which comprises adding to said emulsion a compound taken from the group consisting of the acid-soluble and acid-decomposable inorganic fluorides, in an amount between 0.0005% and approximately 1.0% by weight of the liquids present.

7. The process for breaking an emulsion formed by the vigorous agitation of a liquid iso-aliphatic hydrocarbon with sulfuric acid of greater than 50% strength which comprises adding to said emulsion a compound taken from the group consisting of the acid-soluble and acid-decomposable inorganic fluorides, in an amount between 0.0005% and approximately 1.0% by weight of the liquids present.

8. The process for breaking an emulsion formed by the vigorous agitation of a liquid mononitrated aromatic hydrocarbon with sulfuric acid of greater than 50% strength which comprises adding to said emulsion a compound taken from the group consisting of the acid-soluble and acid-decomposable inorganic fluorides, in an amount between 0.0005% and approximately 1.0% by weight of the liquids present.

9. The process for breaking an emulsion formed by the vigorous agitation of mononitroxylene with its spent nitration acid which comprises adding to said emulsion a compound taken from the group consisting of the acid-soluble and acid-decomposable inorganic fluorides, in an amount between 0.0005% and approximately 1.0% by weight of the liquids present.

10. The process for breaking an emulsion formed by the vigorous agitation of a liquid hydrocarbon and sulfuric acid of greater than 50% strength which comprises adding to said emulsion an absorbent silicious material and a compound taken from the group consisting of the acid-soluble and acid-decomposable inorganic fluorides.

JAMES B. CASTNER.
WESLEY M. NAGLE.